United States Patent [19]

Ettelman et al.

[11] Patent Number: 4,703,243
[45] Date of Patent: Oct. 27, 1987

[54] STEPPING MOTOR HARMONIC SUPPRESSION

[75] Inventors: David J. Ettelman, Hewlett; John G. Floresta, Central Islip, both of N.Y.

[73] Assignee: Kollmorgen Technologies Corporation, Dallas, Tex.

[21] Appl. No.: 817,677

[22] Filed: Apr. 17, 1986

[51] Int. Cl.$^4$ ............................................. H02P 8/00
[52] U.S. Cl. .................................... 318/696; 318/685; 310/49 R; 310/156
[58] Field of Search ................ 318/696, 685; 310/254, 310/49 R, 156

[56] References Cited

U.S. PATENT DOCUMENTS 4,297,625  12/1981  Newell ................................ 318/696
4,516,048   5/1985  Brigham ............................. 310/254

Primary Examiner—William M. Shoop, Jr.
Assistant Examiner—Saul M. Bergmann
Attorney, Agent, or Firm—Morgan & Finnegan

[57] ABSTRACT

A stepping motor including a plurality of stator poles wherein the stator poles are non-symmetrically displaced from their normal position to reduce harmonics in the torque/displacement crossing of the motor.

14 Claims, 10 Drawing Figures

STEPPING MOTOR HARMONIC SUPPRESSION

This invention relates to electric stepping motors suitable for use in stepper systems, and more particularly, to such motors and drive systems with suppressed harmonics for achieving effective microstepping.

BACKGROUND OF THE INVENTION

The most common stepper motor systems employ special two phase synchronous motors in combination with a phase current switching system. The basic full step sequence is achieved by energizing phase A with a positive signal, then energizing phase B with a positive signal as phase A is turned off, then energizing phase A with a negative signal as phase B is turned off, then energizing phase B with a negative signal as phase A is turned off, and then repeating the sequence. The rotor of the motor is advanced incrementally by this four-step sequence, taking one full step at each change in the phase currents. The motor itself preferably includes a large number of poles so that one revolution of the motor includes a large number of incremental steps. An example of a suitable motor for such stepper applications is disclosed in U.S. Pat. No. 4,330,727.

More sophisticated stepper systems employ a control technique called "microstepping" where the motor can be controlled for positioning at a variety of positions intermediate the normal full step positions. Here, the number of intermediate positions is determined by the drive system controller. Such intermediate positions are achieved by proportioning the signals applied to the phase A and phase B windings to obtain a field vector as required for each intermediate point. Since the effect of the control is basically analog rather than digital, the presence of harmonics in the torque characteristic have a substantial effect on achieving position accuracy and, hence, are of great concern.

Various techniques have been employed in the past for suppressing harmonics of the characteristic torque in electric motors. U.S. Pat. No. 4,518,883 describes one of the most effective prior systems wherein a selected number of torque harmonics could be eliminated by following a prescribed procedure for shifting the torque producing stator poles from their nominal positions. In so doing, symmetrical groupings of poles were chosen and then shifted or rotated relative to each other by the angle Pi/H, electrical degrees, where H is the harmonic being suppressed. The number of harmonics that can be eliminated with this technique depends upon the number of independent symmetrical groupings found in the motor. If the number of independent stator poles is $N=2^u$, then the technique of symmetrical shifting of pole positions can be used to substantially eliminate U harmonics.

The disadvantage of the technique described above is that the number of harmonics that can be suppressed depends upon the number of symmetrical groupings existing in the particular motor design. Also, the design can result in an undesirably large loss in motor torque output.

SUMMARY OF THE INVENTION

An object of the present invention is to provide a technique for torque harmonic suppression which does not depend upon movement of pole positions in accordance with symmetrical groupings.

Another object of the invention is to provide a technique for suppressing torque harmonics to a selected degree.

Another object is to provide a technique for achieving the desired degree of harmonic suppression together with the maximum fundamental torque component.

In a conventional stepping motor design, the stator pole teeth are located on centers separated from one another by 2 Pi electrical degrees. With this spacing, the pole teeth have a maximum in phase additive effect in producing torque in accordance with the energization signal. Unfortunately this location of the pole teeth also tends to maximize the contribution of the harmonics to the torque/displacement characteristic of an uncompensated motor, and such harmonics have a substantial adverse effect when attempting to achieve accurate microstepping.

Movement of a pole tooth away from the normal spacing at 2 Pi electrical degrees reduces the vector sum of the torque harmonics and also decreases the vector sum of the fundamental torques. In accordance with the technique of the invention, the effect upon the fundamental and the effect upon each of the harmonics can be calculated for any shift of the pole tooth position from the normal position. The pole teeth positions can be moved individually or in combination.

Although total suppression of selected harmonics can be achieved, such suppression is always achieved at the expense of desired output torque at the fundamental frequency. Therefore, when total suppression is not required, the better design is to have less than maximum harmonic suppression resulting in a higher fundamental output torque. The amount of suppression required for a particular design depends on the magnitude of the harmonics existing in the particular motor design prior to suppression and the requirements of the particular motor application. Some harmonics are small and require little or no suppression. The method according to the invention permits suppression of selected harmonics to a desired degree and therefore suppression can be achieved with a minimum adverse effect on the fundamental torque of the motor.

Normally, the most pronounced harmonics in a stepping motor are the third, fourth and fifth harmonics. Complete suppression of these harmonics reduces the magnitude of the output torque to about 76 percent of the normal value. Motors compensated according to the invention achieve suppression of the third, fourth and fifth harmonics to a level where the harmonics become insignificant while achieving a fundamental output torque greater than 80% and, in the most preferred embodiments, greater than 85%.

Although in most cases the preferred motor design is one that is substantially free of significant harmonics, there are situations where certain harmonics may be desired to, for example, provide a strong detent (fourth harmonic) or a flat-topped torque characteristic (odd harmonics). Using the design technique according to the invention, selected harmonics can be preserved while others are suppressed where desired to achieve particular design characteristics.

BRIEF DESCRIPTION OF THE DRAWINGS

Other characteristics of the invention as well as the properties and advantages obtained by the same will become apparent from the description given hereunder of various embodiments of the motor and control system described by way of example and shown in the drawings, which form a part of the specification, and wherein.

DETAILED DESCRIPTION OF THE INVENTION

Figure 1:
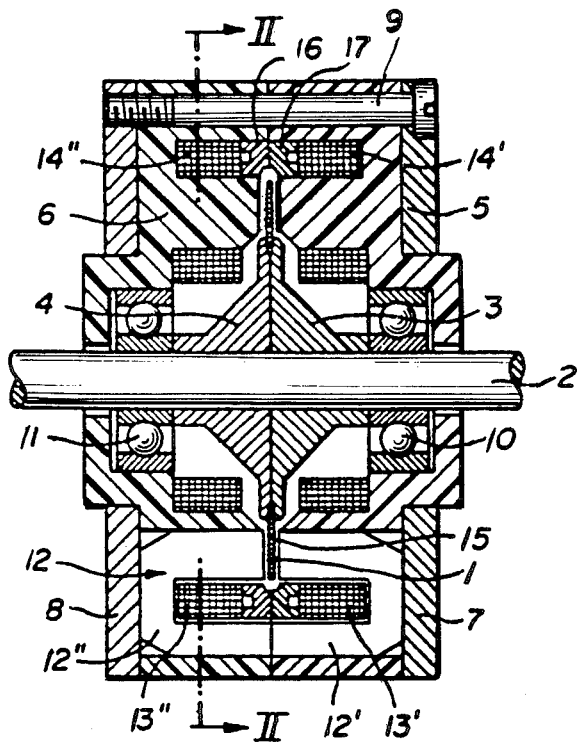
FIG. 1 is an axial sectional view of a two phase step motor in accordance with one embodiment of the invention taken along line I—I of FIG. 2.
Figure 3:
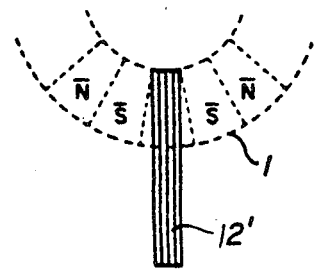
FIG. 3 is a schematic plan view of an elementary magnetic circuit with the cooperating rotor.
Figure 2:
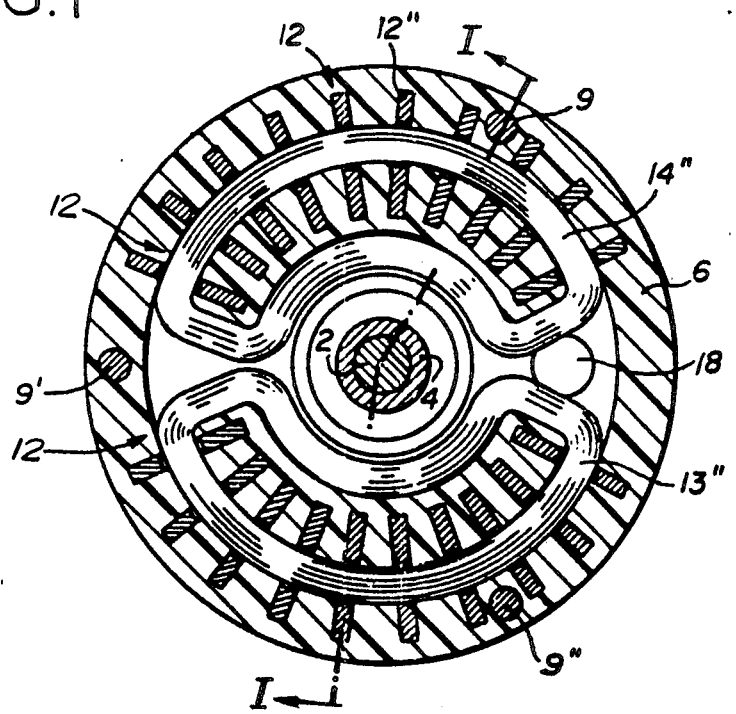
FIG. 2 is a sectional view of the motor along line II—II of FIG. 1.

An embodiment of the motor is shown in FIGS. 1, 2 and 3. Referring to FIGS. 1 and 2, a step motor is shown which includes an annular disc shaped rotor 1 mounted on a shaft 2 by means of a pair of hub members 3, 4. Members 3, 4 are pressed onto the shaft 2 to support at their periphery the thin, annular rotor 1 made of permanent-magnetic material. Two supporting members 5, 6 of a nonmagnetic material, for example of plastic, are arranged in axially facing relationship and are held together by means of annular flanges 7, 8 and screws 9, 9' and 9''. The motor shaft 2 is journaled for rotation by means pf bearings 10, 11 lodged in supporting members 5, 6.

A plurality of elementary magnetic circuits 12 as well as electric coils 13', 13'', 14', 14'' are supported by the supporting members 5, 6.

Each elementary magnetic circuit 12 comprises two U-shaped thin stator pole pieces 12', 12'' of high magnetic permeability arranged in axially facing relationship and extending radially. The outer leg of each U shaped pole piece 12' has its end-face in contact with the corresponding end face of the outer leg of the opposite pole piece 12'', while the inner legs of the pole piece have their end faces spaced to form an air gap 15 therebetween. The pole pieces can be made of plain soft iron or have a laminated structure for further improvement of the circuit quality.

As shown in FIG. 2, the elementary magnetic circuits are divided into two groups, 12A and 12B, each including ten pole pieces which in their normal positions as shown in FIG. 2 are equally anqularly spaced by an angle of 2 pi k/N, where k is a whole number and N the number of pairs of rotor poles. In the embodiment shown k=1 and N=25. As will be described hereinafter, at least some of the pole pieces are shifted from their normal positions in the motor according to the invention.

The groups of elementary circuits are angularly shifted with respect to each other by an angle of 2 pi r/N+ pi/pN, where p is the number of phases and r is a whole number, to assure proper operation of a multiphase motor. In the embodiment shown r=3 or 4 and p=2. Two electric coils or phase windings are coupled with each elementary magnetic circuit. The ten elementary circuits of group 12A, are coupled to coils 14', and 14'' whereas the ten elementary circuits of groups 12B are coupled to coils and 13', 13''. The coils are arranged around legs of the U shaped stator pole-pieces defining the air gaps. The curved shape of the coils assures placement close to the respective legs.

Rings 16, 17 hold the coils in place. Alternatively, a potting compound can be used in place of the rings 16 and 17. Connection wires for the coils are led through a hole 18 in flange 7.

FIG. 3 shows an individual elementary magnetic circuit 12', 12'' of a laminated structure, the legs of each U shaped stator pole piece forming the above mentioned airgap. FIG. 3 also shows, schematically, a peripheral annular zone of the rotor 1, of hard magnetic material which is axially magnetized to exhibit 2 N magnetic poles of alternating polarity on either side thereof, such as the poles indicated "N" and "S".

Figure 4:
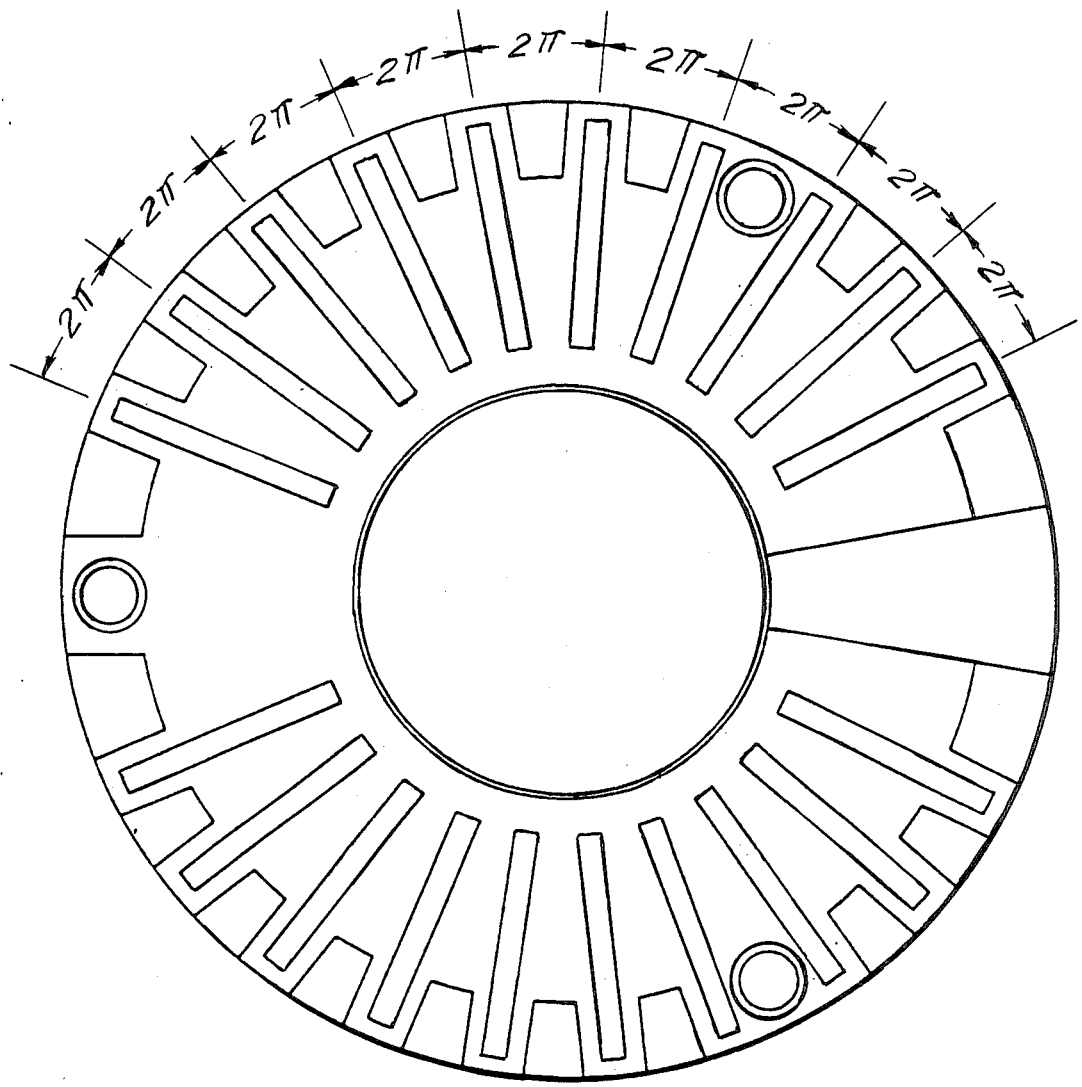
FIG. 4 is a diagram illustrating the normal spacing of the stator poles in a motor of the type shown in FIGS. 1 and 2 which does not incorporate the invention.

FIG. 4 is a cross-sectional view of the motor showing the "normal" displacement of the stator pole pieces prior to any shifting of position in accordance with the invention. In the normal pole piece displacement, such as would exist in the motor not incorporating the invention, the pole pieces are aligned on centers separated by 360 electrical degrees, i.e., a displacement of 2 pi. In the examples set out below, a positive shift angle indicates a shift in the clockwise direction whereas a negative shift angle indicates a shift in the counter-clockwise direction. The positions of the pole pieces according to the invention are as indicated in the examples.

It has been known as described in U.S. Pat. No. 4,518,883 that selected harmonics could be suppressed or eliminated by shifting the pole positions of symmetrical groupings. By using the prior technique, for example, with 4 pole positions available for shifting, two symmetrical subgroups each including a pair of poles can be formed. Then one subgroup can be shifted relative to the symmetrical group by pi/5 electrical degrees to cancel out the fifth harmonic. The individual poles can further be formed into symmetrical groups and these groups can then be shifted by pi/3 electrical degrees to cancel out the third harmonic.

The prior technique as described above is based on the shifting of symmetrical groupings of pole pieces or teeth, to bring about the selective cancellation of specific harmonics. In the technique according to this invention, the shifting of stator pole pieces is done individually and is not done according to symmetrical groupings of pole pieces. The pole pieces are shifted individually and by different amounts. As used herein, the term "non symmetrical" shift of the stator pole pieces refers to stator pole piece displacements which are not symmetrical and, thus, excludes displacements of the type resulting from the shifting of symmetrical groupings of stator pole pieces as disclosed in U.S. Pat. No. 4,518,883.

According to the invention the effect of each pole piece at any position is calculated individually and the individual effects on the motor output torque are then calculated to determine the magnitude of the resultant fundamental torque output as well as the amount of harmonic suppression. Although the calculations can be performed manually, they are preferably performed by computer so that the preferable pole positions can be determined rapidly by trial and error. In other words, the displacement pattern for the pole pieces is arrived at by making small incremetal adjustments in a pole piece positions, and by noting the result on the harmonics. The pole piece positions are adjusted in this manner, working toward increased harmonic suppression until a desired displacement pattern is achieved.

The non-symmetrical shifting of pole piece positions has several advantages over the symmetrical technique.
(1) The number of harmonics that can be suppressed is not limited as in the case with symmetrical technique. For example, with four stator pole pieces available for shifting, the symmetrical technique could provide complete suppression for only two harmonics while, on the other hand, the non symmetrical technique according to this invention can achieve good suppression for three or more harmonics.
(2) The harmonic suppression achieved with either the symmetrical or the non-symmetrical technique reduces the motor output torque. With the non-symmetrical technique, however, the degree of suppression of harmonics can be controlled to minimize the reduction in the motor output torque.
(3) With the non-symmetrical technique the amount of suppression for the individual harmonics can be tailored in accordance with the magnitude of the harmonics in the normal motor design. Thus, large harmonics can be heavily suppressed whereas the small harmonics may receive little or no suppression.

Figure 5A:
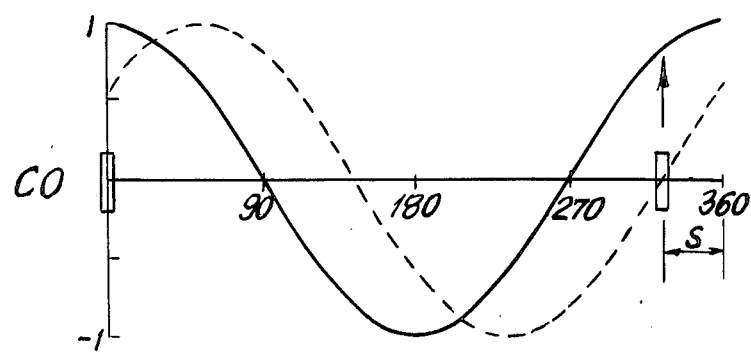
FIGS. 5A–5D are a series of illustrations showing the effect of stator pole position shifting to achieve harmonic suppression.
Figure 5B:
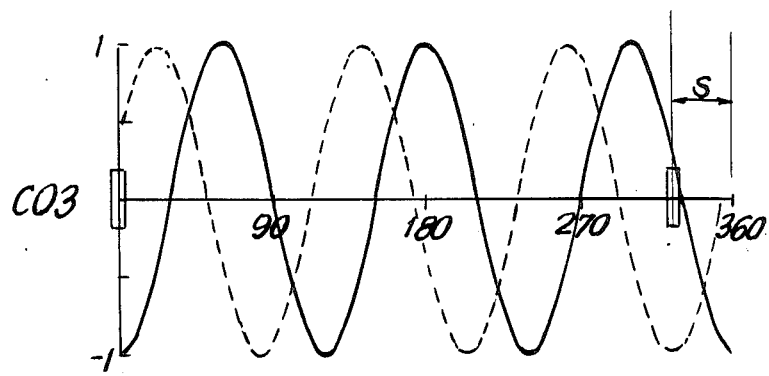
Figure 5C:
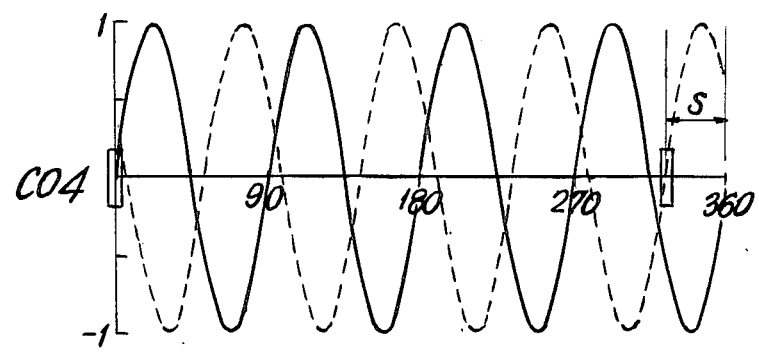
Figure 5D:
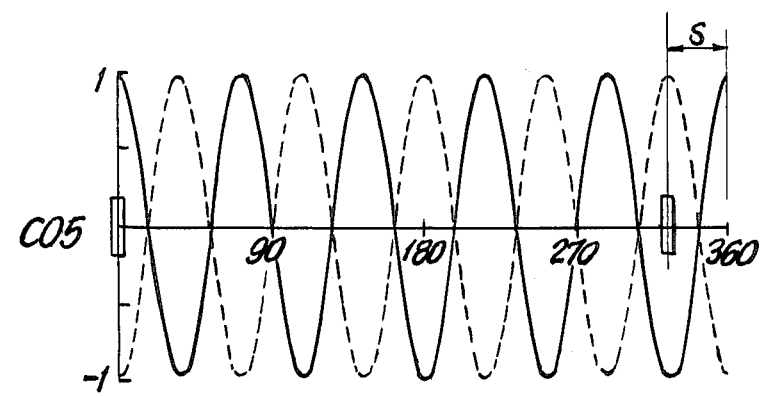

FIGS. 5A–5D are a series of illustrations showing the output torque produced by each pole of a pair of pole pieces where the normal displacement has been changed by "S" electrical degrees by shifting the stator pole position. FIG. 5 illustrates the effect on the fundamental and FIGS. 5B, 5C and 5D illustrate the effect of this same shift on the third, fourth, and fifth harmonics, respectively.

As illustrated in FIG. 5A for the fundamental, one stator pole piece produces a torque which is in-phase as shown by the solid trace of FIG. 5A. If another pole piece is shifted by "S" electrical degrees from its normal position at 2 pi electrical degrees from the first pole piece, it produces a torque as shown in the dotted line.

The effect of each pole piece in the motor can be individually calculated on a per phase basis and the effect on the total motor torque can be determined by summing the individual pole piece contributions. If the pole pieces in each phase are similarly shifted in position, it is not necessary to calculate the actual total torque by vectorially summing the phase torques since calculation for a single phase provides the percentage torque reduction. The fundamental torque summation for a phase is in accordance with the following equation:

$$H_o = \sin(wt + S_1) + \sin(wt + S_2) + \sin(wt + S_3) + \cdots \quad (1)$$

where $S_1, S_2, S_3$ ——— are the respective shift angles. From equation (1) it can be seen that the torque output is a vector summation taking into account the phase shift resulting from the individual shifts in the pole piece positions.

The same pole position shift, with respect to the third harmonic, has three times the effect because of the higher frequency of the harmonic. Thus, the individual contributions on a per phase basis to the third harmonic can be calculated for each of the stator pole pieces in accordance with the following equation:

$$H_3 = \sin(wt + 3S_1) + \sin(wt + 3S_2) + \sin(wt + 3S_3) \cdots \quad (2)$$

Likewise, the fourth and fifth harmonics can be calculated as follows:

$$H_4 = \sin(wt + 4S_1) + \sin(wt + 4S_2) + \sin(wt + 4S_3) \cdots \quad (3)$$

$$H_4 = \sin(wt + 5S_1) + \sin(wt + 5S_2) + \sin(wt + 5S_3) \cdots \quad (4)$$

Thus, as can be seen from equations (2) (3) and (4), the amount of harmonic suppression is likewise determined by vector summation. These summations for the harmonics can be divided by the number of poles and multiplied by 100 to determine the percentage of the harmonic remaining following suppression as compared to the magnitude of the harmonic existing in the motor with pole pieces in the normal position.

Harmonic reduction is achieved where the components at the harmonic frequency tend to cancel one another. This can be achieved with respect to a pair of poles by shifting one 180 electrical degrees for the particular harmonic being cancelled. Similarly, using three poles, if one pole is shifted +120 electrical degrees and another is shifted −120 electrical degrees, the harmonic contribution from the three poles cancels out. Similarly, harmonic cancellation can be achieved by appropriately shifting larger groups. The conflicting requirements for cancellation of the different harmonics makes it difficult or impossible to achieve perfect cancellation of all harmonics. However in designing a motor according to the invention, the design is facilitated by shifting the poles systematically toward the positions cancelling the harmonics.

Although the normal magnitude of a harmonic depends on the motor construction details, typical values for the normal harmonics as a percentage of fundamental in a two-phase motor like that shown in FIGS. 1-3 would be:
3rd Harmonic 25%
4th Harmonic 15%
5th Harmonic 10%

A two phase construction tends to cancel out most of the second harmonic and normally harmonics above the fifth are not substantial. Thus, only the 3rd, 4th and 5th harmonics need be considered as a practical matter.

Generally, if the value of a harmonic can be reduced to below 3% of the magnitude of the fundamental, the harmonic has no significant effect and can be considered virtually eliminated. Thus, assuming the values indicated above, if the 3rd harmonic (at 25%) could be reduced to 12% of the initial value, this harmonic would fall below 3% and is substantially eliminated. Similarly, if the 4th harmonic is reduced to 20% of the initial value, it is substantially eliminated. If the 5th harmonic is reduced to 30% of the initial value, it too is substantially eliminated.

Preferably the harmonics combined should be below 5% of mainitude of the fundamental. The approximate total harmonic distortion (THD) can be calculated using harmonic percentage values in the following equation for the main harmonics (i.e. 3rd, 4th and 5th):

$$THD \cong \sqrt{(H_3\%)^2 + (H_4\%)^2 + (H_5\%)^2} \quad (5)$$

Since suppression of harmonics by shifting pole positions reduces the torque output of the motor it is preferable to provide no more suppression than is required.

In other words, the shift angles should be selected to provide the required suppression with a minimum reduction in the output torque at the fundamental frequency.

EXAMPLE 1

In this example the pole positions are shifted by the angles indicated in the column headed "shift" in Table 1. The shift angles are in electrical degrees relative to the normal pole piece position. A positive shift angle is a clockwise shift whereas a negative shift angle is a counterclockwise shift.

value is then normalized by dividing by the number of poles.

With the shift angles indicated in Table 1 the 3rd harmonic is reduced to 5.08% of the initial value, the 4th harmonic is reduced to 9.63% of the initial value and the 5th harmonic is reduced to 2.25% of the initial value. If the initial values of the 3rd, 4th and 5th harmonics are 25%, 15% and 10%, respectively, then the values would be 1.27%, 1.45% and 0.22% after suppression. The total harmonic distortion (THD) is 1.94%. In this example the fundamental is only reduced to 82.92% of the initial value as a result of the pole shifting to achieve harmonic suppression.

EXAMPLE 2

TABLE 1

|  |  |  |  | 1st | 82.92% |  |  |  |  |
|  | # poles = 10 |  |  | 3rd | 5.08% |  | 25.00% | 1.27% |  |
|  |  |  |  | 4th | 9.63% |  | 15.00% | 1.45% |  |
|  |  |  |  | 5th | 2.25% |  | 10.00% | 0.22% |  |
|  |  |  |  |  |  |  | THD = | 1.94% |  |

| Pole # | Shift | R1 | I1 | R3 | I3 | R4 | I4 | R5 | I5 |
|---|---|---|---|---|---|---|---|---|---|
| 1 | 3 | 0.9986 | 0.0523 | 0.9877 | 0.1564 | 0.9781 | 0.2079 | 0.9659 | 0.2588 |
| 2 | −34 | 0.8290 | −0.5592 | 0.2079 | 0.9781 | −0.7193 | −0.6947 | 0.9848 | −0.1736 |
| 3 | −73 | 0.2924 | −0.9563 | −0.7771 | 0.6293 | 0.3746 | 0.9272 | 0.9962 | −0.0872 |
| 4 | 27 | 0.8910 | 0.4540 | 0.1564 | 0.9877 | −0.3090 | 0.9511 | −0.7071 | 0.7071 |
| 5 | −10 | 0.9848 | 0.1736 | 0.8860 | −0.5000 | 0.7660 | −0.6428 | 0.6428 | −0.7660 |
| 6 | −34 | 0.8290 | −0.5592 | −0.2079 | −0.9781 | −0.7193 | −0.6947 | −0.9848 | −0.1736 |
| 7 | −73 | 0.2924 | −0.9563 | −0.7771 | 0.6293 | 0.3746 | 0.9272 | 0.9962 | −0.0872 |
| 8 | 30 | 0.8660 | 0.5000 | .0000 | 1.0000 | −0.5000 | 0.8660 | −0.8660 | 0.5000 |
| 9 | −10 | 0.9848 | −0.1736 | 0.8660 | −0.5000 | 0.7660 | −0.6428 | 0.6428 | −0.7660 |
| 10 | −41.5 | 0.7490 | −0.6626 | −0.5664 | −0.8241 | −0.9703 | −0.2419 | −0.8870 | 0.4617 |
| SUM |  | 7.7171 | −3.0346 | 0.3397 | −0.3777 | 0.0415 | 0.9625 | −0.1859 | −0.1260 |
| SQUARE |  | 59.5529 | 9.2087 | 0.1154 | 0.1426 | 0.0017 | 0.9265 | 0.0345 | 0.0159 |
| SUM:SQR |  | 68.7616 |  | 0.2580 |  | 0.9282 |  | 0.0504 |  |
| SQRT |  | 8.2923 |  | 0.5079 |  | 0.9634 |  | 0.2246 |  |
| /10 |  | 0.8292 |  | 0.0508 |  | 0.0963 |  | 0.0255 |  |

In Table 1 the real and imaginary components of the vectors for the fundamental are calculated in columns R1 and I1. Similarly the rear components for the 3rd, 4th and 5th harmonics are calculated in columns R3, R4 and R5 whereas the imaginary components are calculated in columns I3, I4 and I5. The columns are summed and then squared. The squares are then summed and the square root taken to obtain the vector sum value. This In this example ten pole positions are shifted as indicated in Table 2. This example is suitable for shifting the ten available pole positions, shown in FIG. 4. The harmonic suppression in this example is less than in example 1, but still adequate to maintain each of the harmonics at less than 3% of the fundamental and the total harmonic distortion (THD) below 5%. The benefit of the reduced suppression is a higher fundamental at 85.01% of the original value.

TABLE 2

|  |  |  |  | 1st | 85.01% |  |  |  |  |
|  | # poles = 10 |  |  | 3rd | 11.98% |  | 25.00% | 3.00% |  |
|  |  |  |  | 4th | 6.89% |  | 15.00% | 1.03% |  |
|  |  |  |  | 5th | 0.74% |  | 10.00% | 0.07% |  |
|  |  |  |  |  |  |  | THD = | 3.17% |  |

| Pole # | Shift | R1 | I1 | R3 | I3 | R4 | I4 | R5 | I5 |
|---|---|---|---|---|---|---|---|---|---|
| 1 | 0 | 1.0000 | 0.0000 | 1.0000 | 0.0000 | 1.0000 | 0.0000 | 1.0000 | 0.0000 |
| 2 | −28 | 0.8829 | −0.4695 | 0.1045 | −0.9945 | −0.3746 | −0.9272 | −0.7660 | −0.6428 |
| 3 | −66 | 0.4067 | −0.9135 | −0.9511 | 0.3090 | −0.1045 | 0.9945 | 0.8660 | 0.5000 |
| 4 | 29 | 0.8746 | 0.4848 | 0.0523 | 0.9986 | 0.4384 | 0.8988 | −0.8192 | 0.5736 |
| 5 | −10.5 | 0.9833 | −0.1822 | 0.8526 | −0.5225 | 0.7431 | −0.6691 | 0.6088 | −0.7934 |
| 6 | −28 | 0.8829 | −0.4695 | 0.1045 | −0.9945 | −0.3746 | −0.9272 | −0.7660 | −0.6428 |
| 7 | −66 | 0.4067 | −0.9135 | −0.9511 | 0.3090 | −0.1045 | 0.9945 | 0.8660 | 0.5000 |
| 8 | 29 | 0.8746 | 0.4848 | 0.0523 | 0.9986 | −0.4384 | 0.8988 | −0.8192 | 0.5736 |
| 9 | −10.5 | 0.9833 | −0.1822 | 0.8526 | −0.5225 | 0.7431 | −0.6691 | 0.6088 | −0.7934 |
| 10 | −45 | 0.7071 | −0.7071 | −0.7071 | −0.7071 | −1.0000 | .0000 | −0.7071 | 0.7071 |
| SUM |  | 8.0022 | −2.8680 | 0.4098 | −1.1259 | −0.3487 | 0.5940 | 0.0721 | −0.0180 |
| SQUARE |  | 64.0356 | 8.2254 | 0.1679 | 1.2675 | 0.1216 | 0.3528 | 0.0052 | 0.0003 |
| SUM:SQR |  | 72.2610 |  | 1.4355 |  | 0.4744 |  | 0.0055 |  |
| SQRT |  | 8.5006 |  | 1.1981 |  | 0.6888 |  | 0.0743 |  |
| /10 |  | 0.8501 |  | 0.1198 |  | 0.0689 |  | 0.0074 |  |

EXAMPLE 3

In this example the shift angles are as indicated in Table 3. The harmonics are each suppressed to values below 4% of the fundamental (0.08%, 0.39% and 0.35%) and the THD is below 1% (0.53%). The fundamental is, however, reduced to 77.66% of the initial value.

and poles 3 and 4 as a group are shifted Pi/3 (60°) electrical degrees relative to poles 1 and 2 to cancel the 3rd harmonic. The resulting shift angles are 0, 36, 60 and 96 degrees as indicated in Table 4. As shown by the calulations, the 3rd and 5th harmonics are cancelled, but the 4th harmonic is at 15.45% of the original value. The fundamental is at 82.36%.

TABLE 4

| | | | 1st | 82.36% | | |
|---|---|---|---|---|---|---|
| | # poles = 4 | | 3rd | 0.00% | 25.00% | 0.00% |
| | | | 4th | 15.45% | 20.00% | 3.09% |
| | | | 5th | 3.47% | 10.00% | 0.00% |
| | | | | | THD = | 3.09% |

| Pole # | Shift | R1 | I1 | R3 | I3 | R4 | I4 | R5 |
|---|---|---|---|---|---|---|---|---|
| 1 | 0 | 1.0000 | 0.0000 | 1.0000 | 0.0000 | 1.0000 | 0.0000 | 1.0000 |
| 2 | 36 | 0.8090 | 0.5878 | −0.3090 | 0.9511 | −0.8090 | 0.5878 | −1.0000 |
| 3 | 60 | 0.5000 | 0.8660 | −1.0000 | .0000 | −0.5000 | −0.8660 | 0.5000 |
| 4 | 96 | −0.1045 | 0.9945 | 0.3090 | −0.9511 | 0.9135 | 0.4067 | −0.5000 |
| SUM | | 2.2045 | 2.4483 | 0.0000 | .0000 | 0.6045 | 0.1285 | 0.0000 |
| SQUARE | | 4.8598 | 5.9943 | 0.0000 | .0000 | 0.3655 | 0.0165 | 0.0000 |
| SUM:SQR | | 10.8541 | | .0000 | | 0.3820 | | .0000 |
| SQRT | | 3.2946 | | .0000 | | 0.6180 | | .0000 |
| /4 | | 0.8236 | | .0000 | | 0.1545 | | .0000 |

TABLE 3

| | | | 1st | 77.66% | | |
|---|---|---|---|---|---|---|
| | # poles = 10 | | 3rd | 0.33% | 25.00% | 0.08% |
| | | | 4th | 2.58% | 15.00% | 0.39% |
| | | | 5th | 3.47% | 10.00% | 0.35% |
| | | | | | THD = | 0.53% |

| Pole # | Shift | R1 | I1 | R3 | I3 | R4 | I4 | R5 | I5 |
|---|---|---|---|---|---|---|---|---|---|
| 1 | 0 | 1.0000 | 0.0000 | 1.0000 | 0.0000 | 1.0000 | 0.0000 | 1.0000 | 0.0000 |
| 2 | −86 | 0.0698 | −0.9976 | −0.2079 | 0.9781 | 0.9613 | 0.2756 | 0.3420 | −0.9397 |
| 3 | −50 | 0.6428 | −0.7660 | −0.8660 | −0.5000 | −0.9397 | 0.3420 | −0.3420 | 0.9397 |
| 4 | −11 | 0.9816 | −0.1908 | 0.8387 | −0.5446 | 0.7193 | −0.6947 | 0.5736 | −0.8192 |
| 5 | 25 | 0.9063 | 0.4226 | 0.2588 | 0.9659 | −0.1736 | 0.9848 | −0.5736 | 0.8192 |
| 6 | −57 | 0.5446 | −0.8387 | −0.9877 | −0.1564 | −0.6691 | 0.7431 | 0.2588 | 0.9659 |
| 7 | −21 | 0.9336 | −0.3584 | 0.4540 | −0.8910 | 0.1045 | −0.9945 | −0.2588 | −0.9659 |
| 8 | 18 | 0.9511 | 0.3090 | 0.5878 | 0.8090 | 0.3090 | 0.9511 | .0000 | 1.0000 |
| 9 | 54 | 0.5878 | 0.8090 | −0.9511 | 0.3090 | −0.8090 | −0.5878 | .0000 | −1.0000 |
| 10 | −32 | 0.8480 | −0.5299 | −0.1045 | −0.9945 | −0.6157 | 0.7880 | −0.9397 | −0.3420 |
| SUM | | 7.4656 | −2.1407 | 0.0221 | −0.0245 | −0.1130 | 0.2317 | 0.0603 | −0.3420 |
| SQUARE | | 55.7350 | 4.5827 | 0.0005 | 0.0006 | 0.0128 | 0.0537 | 0.0036 | 0.1170 |
| SUM:SQR | | 60.3177 | | 0.0011 | | 0.0665 | | 0.1206 | |
| SQRT | | 7.7664 | | 0.0330 | | 0.2578 | | 0.3473 | |
| /10 | | 0.7766 | | 0.0033 | | 0.0258 | | 0.0347 | |

EXAMPLE 4

In this example a motor with only 4 pole pieces avaiabe for shifting is assumed. The poles are shifted symmetrically according to the prior technique. Poles 2 and 4 are each shifted Pi/5 (36°) electrical degrees relative to poles 1 and 3 respectively to cancel the 5th harmonic

EXAMPLES 5 and 6

Using the non-symmetrical shift technique according the invention, the 4 available poles can be shifted as indicated in tables 5 and 6 so that none of the harmonics is greater than 3% of the initial fundamental and so that the fundamental is increased to slightly above 85% of the initial value.

TABLE 5

| | | | 1st | 85.03% | | |
|---|---|---|---|---|---|---|
| | # poles = 4 | | 3rd | 11.83% | 25.00% | 2.96% |
| | | | 4th | 5.32% | 20.00% | 1.06% |
| | | | 5th | 7.02% | 10.00% | 0.70% |
| | | | | | THD = | 3.22% |

| Pole # | Shift | R1 | I1 | R3 | I3 | R4 | I4 | R5 |
|---|---|---|---|---|---|---|---|---|
| 1 | 0 | 1.0000 | 0.0000 | 1.0000 | 0.0000 | 1.0000 | 0.0000 | 1.0000 |
| 2 | 39 | 0.7771 | 0.6293 | −0.4540 | 0.8910 | −0.9135 | 0.4067 | −0.9659 |
| 3 | 52 | 0.6157 | 0.7880 | −0.9135 | 0.4067 | −0.8829 | −0.4695 | −0.1736 |
| 4 | 90 | .0000 | 1.0000 | .0000 | −1.0000 | 1.0000 | .0000 | .0000 |
| SUM | | 2.3928 | 2.4173 | −0.3675 | 0.2977 | 0.2035 | −0.0627 | −0.1396 |
| SQUARE | | 5.7255 | 5.8435 | 0.1351 | 0.0887 | 0.0414 | 0.0039 | 0.0195 |
| SUM:SQR | | 11.5690 | | 0.2237 | | 0.0454 | | 0.0788 |
| SQRT | | 3.4013 | | 0.4730 | | 0.2130 | | 0.2808 |

TABLE 5-continued

| | | | | |
|---|---|---|---|---|
| /4 | 0.8503 | 0.1183 | 0.0532 | 0.0702 |

TABLE 6

| | | 1st | 85.23% | | | |
|---|---|---|---|---|---|---|
| | # poles = 4 | 3rd | 11.96% | | 25.00% | 2.99% |
| | | 4th | 7.42% | | 20.00% | 1.48% |
| | | 5th | 4.36% | | 10.00% | 0.44% |
| | | | | | THD = | 3.37% |

| Pole # | Shift | R1 | I1 | R3 | I3 | R4 | I4 | R5 |
|---|---|---|---|---|---|---|---|---|
| 1 | 0 | 1.0000 | 0.0000 | 1.0000 | 0.0000 | 1.0000 | 0.0000 | 1.0000 |
| 2 | 38 | 0.7880 | 0.6157 | −0.4067 | 0.9135 | −0.8829 | 0.4695 | −0.9848 |
| 3 | −51 | 0.6293 | −0.7771 | −0.8910 | −0.4540 | −0.9135 | 0.4067 | −0.2588 |
| 4 | −15 | 0.9659 | −0.2588 | 0.7071 | −0.7071 | 0.5000 | −0.8660 | 0.2588 |
| SUM | | 3.3833 | −0.4203 | 0.4094 | −0.2476 | −0.2965 | 0.0102 | 0.0152 |
| SQUARE | | 11.4464 | 0.1767 | 0.1676 | 0.0613 | 0.0879 | 0.0001 | 0.0002 |
| SUM:SQR | | 11.6231 | | 0.2289 | | 0.0880 | | 0.0304 |
| SQRT | | 3.4093 | | 0.4784 | | 0.2967 | | 0.1743 |
| /4 | | 0.8523 | | 0.1196 | | 0.0742 | | 0.0436 |

Figure 6:
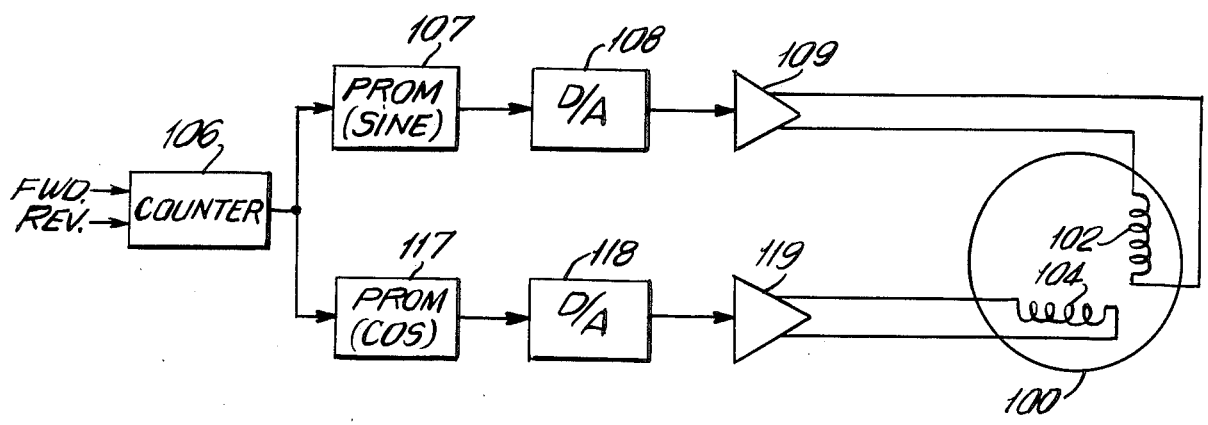
FIGS. 6 and 7 are schematic block diagrams showing control circuitry for a microstepping system according to the invention.

One embodiment of the motor drive circuitry for microstepping a two phase synchronous stepping motor is shown in FIG. 6. Stepping motor 100 includes two phase windings 102 and 104. The stepping position is controlled according to the digital count in a counter 106 which receives forward (FWD) and reverse (REV) pulses to cause the counter to count up and down The digital output count from the counter is supplied as an address input to a sine PROM (programmable read only memory) 107 and to a cosine PROM 117. The digital outputs from PROMs 107 and 117 are supplied to digital to analog (D/A) converters 108 and 618 which in turn supply analog input signals to power amplifiers 109 and 119 respectively. Amplifier 109 supplies energizing current to motor winding 102 and drive amplifier 11 similarly provides energizing current to motor winding 104. The drive amplifiers are preferably of the chopper or pulse width modulated type.

The digital count appearing at the output of counter 106, which indicates the desired microstep position, is converted to a corresponding digital sine value by PROM 107 and is converted to a corresponding digital cosine value by PROM 117. The sine and cosine values are converted to corresponding analog signal values by converters 108 and 118, and currents proportional to these analog values are supplies to the motor by drive amplifiers 109 and 119.

The sine and cosine values can be used in PROMs 107 and 117 to accurately control micropositioning of the motor only if there are no substantial harmonics in the motor torque displacement characteristic. As previously described, the microstepping motor according to the invention is constructed to suppress significant harmonics and therefore accurate microstep positioning can be achieved by using sine wave quadrature proportioning in the drive signals. The positioning accuracy can be further improved by adjusting the proportioned values stored in the PROMs to more exactly correspond to the torque displacement characteristic of the motor. Since the significant motor harmonics are suppressed in the stepping motor according to the invention, the deviation from the ideal sinusoidal proportioned signals is small and, therefore, effective improvement in the accuracy can be achieved over a broad torque and speed range.

Figure 7:
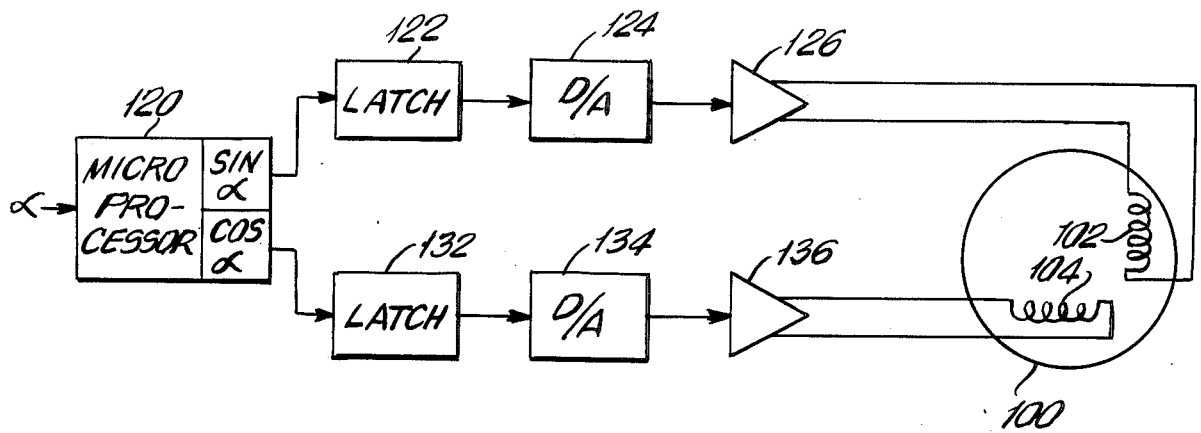

Another embodiment of the drive circuitry for motor 100 is shown in FIG. 7 wherein a microprocessor is used to calculate the proportioned drive signals. Microprocessor 120 receives a digital indication of the desired microstep angular position alpha (α) and produces digital values for sine α and cosine α at the two output ports. The digital output indications of the microprocessor are supplied to latches 122 and 132, respectively, to hold the digital indications during subsequent calculations by the microprocessor. The digital output of latch circuit 122 is converted to a corresponding analog value by D/A converter 124 and the analog signal is converted to a corresponding drive current supplied to motor winding 102 by drive amplifier 126. Similarly, the digital output from latch circuit 132 is, in turn, converted to a corresponding analog signal by D/A converter 134 and the analog value, in turn, is converted to a drive current for winding 104 by drive amplifier 136.

Although the microprocessor can be programmed to calculate sine and cosine values, a faster and simpler approach is to obtain the values from a look up table stored in the microprocessor memory. The use of a look-up table also permits adjustment of the proportioned values to the actual torque/displacement characteristic of the motor.

While only a few illustrative embodiments have been described in detail, there are numerous other embodiments within the scope of this invention as defined by the appended claims.

We claim:

1. A system for a microstepping control comprising:
   digital means for providing multi-phase signals proportioned to provide a plurality of step values for motor positioning between 0 and 2 pi electrical degrees;
   drive circuit means for providing a polyphase energizing current for the motor corresponding to said step values;
   a stepping motor including
      at least two phase windings connected to receive said energizing currents proportioned according to said step values,
      a plurality of pole pieces associated with each of said windings and positioned to provide an air gap for the motor,
      magnetic circuits for coupling said windings to said pole pieces, a rotor in said air gap being positionable in accordance with said proportioned energizing currents applied to said windings; and at least some of said plurality of pole pieces being non-symmetrically displaced to reduce multiple harmonics in the torque/displacement characteristics of the motor below predetermined levels.

2. The system according to claim 1 wherein said digital means provides said multi-phase signals proportioned according to sine quadrature values.

3. The system according to claim 1 wherein said digital means provides said multi-phase signals pproportioned according to the motor torque/displacement characteristic with harmonics suppressed below predetermined levels.

4. The system according to claim 1 wherein said digital means includes a counter for indicating step positions and a read only memory for providing said step values according to the step positions indicated by said counter.

5. The system according to claim 1 wherein said digital means includes a microprocessor.

6. The system according to claim 1 wherein said stepping motor is a two phase motor and wherein said pole pieces are shifted from the normal pole positions to suppress the 3rd, 4th and 5th harmonics.

7. A polyphase electrical stepper motor including a stator with a plurality of stator pole pieces, at least two electrical phase windings adapted for proportional energization, stator magnetic circuits for coupling said stator pole pieces to said windings, and the stator pole pieces being disposed to provide an air gap; and a rotor with N magnetic poles coupled to the stator magnetic circuits through the air gap and being positionable in accordance with the proportioned energization of the phase windings;

the improvement comprising a non-symmetrical shift of a plurality of the stator poles from the normal position at a separation in position of pi electrical degrees to achieve suppression of all significant harmonics to below a predetermined level.

8. An electric motor according to claim 7 wherein said pole pieces are non-symmetrically shifted so that none of the the 3rd, 4th and 5th harmonics exceeds 3% of the fundamental.

9. An electric motor according to claim 7 wherein said pole pieces are non-symmetrically shifted so that the total harmonic distortion does not exceed 5% of the fundamental.

10. An electric motor according to claim 7 wherein said harmonics are suppressed and wherein the fundamental is not reduced below 80% of the value where none of the poles are shifted from said normal position.

11. A polyphase electrical stepper motor comprising:

a stator including a plurality of stator pole pieces, at least two electrical phase windings, stator magnetic circuits for coupling said stator pole pieces to said windings, and said stator pole pieces being disposed to provide an air gap;

a rotor with N magnetic poles coupled to said stator magnetic circuits through said air gap and being positionable in accordance with a proportioned energization of said phase windings; and at least some of said stator pole pieces being shifted non symmetrically from the normal postion thereof at a separation in position of 2 pi electrical degrees to achieve suppression of all significant harmonics to below a predetermined level.

12. An electric motor according to claim 11 wherein said pole pieces are non-symmetrically shifted so that none of the 3rd, 4th and 5th harmonics exceeds 3% of the fundamental.

13. An electric motor according to claim 11 wherein said pole pieces are non-symmetrically shifted so that the total harmonic distortion (THD) does not exceed 5% of the fundamental.

14. An electric motor according to claim 11 wherein said harmonics are supressed and wherein said fundamental is not reduced below 80% of the value where none of the poles are shifted from said normal positions.

* * * * *